United States Patent [19]
Wirebaugh

[11] Patent Number: 5,840,019
[45] Date of Patent: Nov. 24, 1998

[54] GRAPHIC PRESENTATION CHART OF MEDICAL TESTS FOR A PATIENT

[76] Inventor: Jeffrey F. Wirebaugh, 7320 Red Maple Dr., Holland, Ohio 43528

[21] Appl. No.: 791,610

[22] Filed: Jan. 31, 1997

Related U.S. Application Data

[60] Provisional application No. 60/010,894 Jan. 31, 1996.

[51] Int. Cl.$^6$ .......................................................... A61B 5/00
[52] U.S. Cl. .............................................................. 600/300
[58] Field of Search .................................... 128/898, 923; 600/300, 921

[56] References Cited

U.S. PATENT DOCUMENTS

| | | |
|---|---|---|
| 4,878,175 | 10/1989 | Norden-Paul et al. . |
| 4,951,197 | 8/1990 | Mellinger ............................ 128/921 X |
| 5,121,470 | 6/1992 | Trautman . |
| 5,150,457 | 9/1992 | Behm et al. . |
| 5,179,639 | 1/1993 | Taaffe . |
| 5,251,126 | 10/1993 | Kahn et al. ......................... 128/923 X |
| 5,520,176 | 5/1996 | Cohen ..................................... 600/300 |

OTHER PUBLICATIONS

MetGraph Trend Report, "Comparison Of Results To Normalized Reference Values, Feb. 2, 1994 Zymed Patient Summary", 1990.

*Primary Examiner*—John P. Lacyk
*Assistant Examiner*—Samuel Gilbert
*Attorney, Agent, or Firm*—MacMillan, Sobanski & Todd, LLC

[57] ABSTRACT

A graphic presentation chart of medical tests for a patient which is simple, easy to read, and complete includes at least one horizontally extending row having a plurality of individual boxes. Each of the boxes of the row is provided with indicia representing a particular medical test, and indicia representing an associated date for the respective medical test. The graphic presentation chart further includes a process for converting numerical medical test data from a plurality of medical tests into graphic form and displaying the graphic form in each of the boxes to thereby produce the graphic presentation chart.

18 Claims, 10 Drawing Sheets

| | | 49A | 49B | | | | |
|---|---|---|---|---|---|---|---|
| | | 1 1 2 2 2 0 | 1 | 1 | 1 | 1 | 1 |
| | | 8 0 2 4 5 | 4 | 4 | 4 | 9 | 9 |
| H | | CATHETERIZ ED URINE | AEROBIC GALLBLADDER | AEROBIC GALLBLADDER | ANAEROBIC GALLBLADDER | BLOOD SPECIMEN #1 | BLOOD SPECIMEN #2 |
| | | MIXED SKIN & ENTERIC FLO-RA (2 SPECIES) | GRAM STAIN: MOD. WBC MOD. GRAM NEG RODS | CULTURE: CITROBACTOR FREUNDII SEE SENSITIV-ITY | NO ORGANISMS ISOLATED | CULTURE: NO GROWTH 48 NO GROWTH 7 | CULTURE: NO GROWTH 48 GRAM + COCCI (12/22/93) STAPH SPECIES (12/23/93) STAPH HOMINIS (PROB. CON-TAMINANT) |
| L | | | | | | | |

GENT. TRGH BACTERIOLOGY — 49C, 49D, 49E, 49F, 49G

— 49

— 50

| | 1 4 | |
|---|---|---|
| H | ABO: O RHO(D): POS ANTIBODY SCREEN: NEG AUTO CONTROL: NEG TYPE & SCREEN DONE 12/14 | |
| L | | |

IMMUNOHEMATOLOGY — 50A

PATIENT NAME

GRAPHIC PRESENTATION CHART OF MEDICAL TESTS FOR A PATIENT

CROSS-REFERENCE TO RELATED APPLICATION

This application claims the benefit of U.S. Provisional Application No. 60/010,894 filed Jan. 31, 1996.

BACKGROUND OF THE INVENTION

This invention relates in general to medical tests for a patient and in particular to a graphic presentation chart of such medical tests.

The demands on today's physicians are constantly increasing. In a typical day, a physician can review approximately 35 pages of medical test reports a patient, or a total of approximately 450 pages of medical test for all patients that are seen. The information contained in the test reports is important to the physician treating the patient. Unfortunately, the review of the multitude of pages of tests reports is time consuming and difficult. Thus, it would be desirable to provide an improved display of medical tests for a patient which is simple, easy to read, and complete.

SUMMARY OF THE INVENTION

This invention relates to a graphic presentation chart of medical tests for a patient which is simple, easy to read, and complete. The graphic presentation chart includes at least one horizontally extending row having a plurality of individual boxes. Each of the boxes of the row is provided with indicia representing a particular medical test, and indicia representing an associated date for each of the respective medical tests. The graphic presentation chart further includes means for converting numerical medical test data from a plurality of medical tests into graphic form and displaying the graphic form in each of the boxes to thereby produce the graphic presentation chart.

One advantage of this invention is that the graphic presentation chart provides a quick, easy to read, and complete review of medical test results. Also, the graphic presentation chart provides a check list or reminder of what tests have been ordered, and what tests have not been ordered. In addition, the graphic presentation chart makes is easier for a physician to recognize trends, and also can display past medical test results for a patient along with the current test results.

Other advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1A:
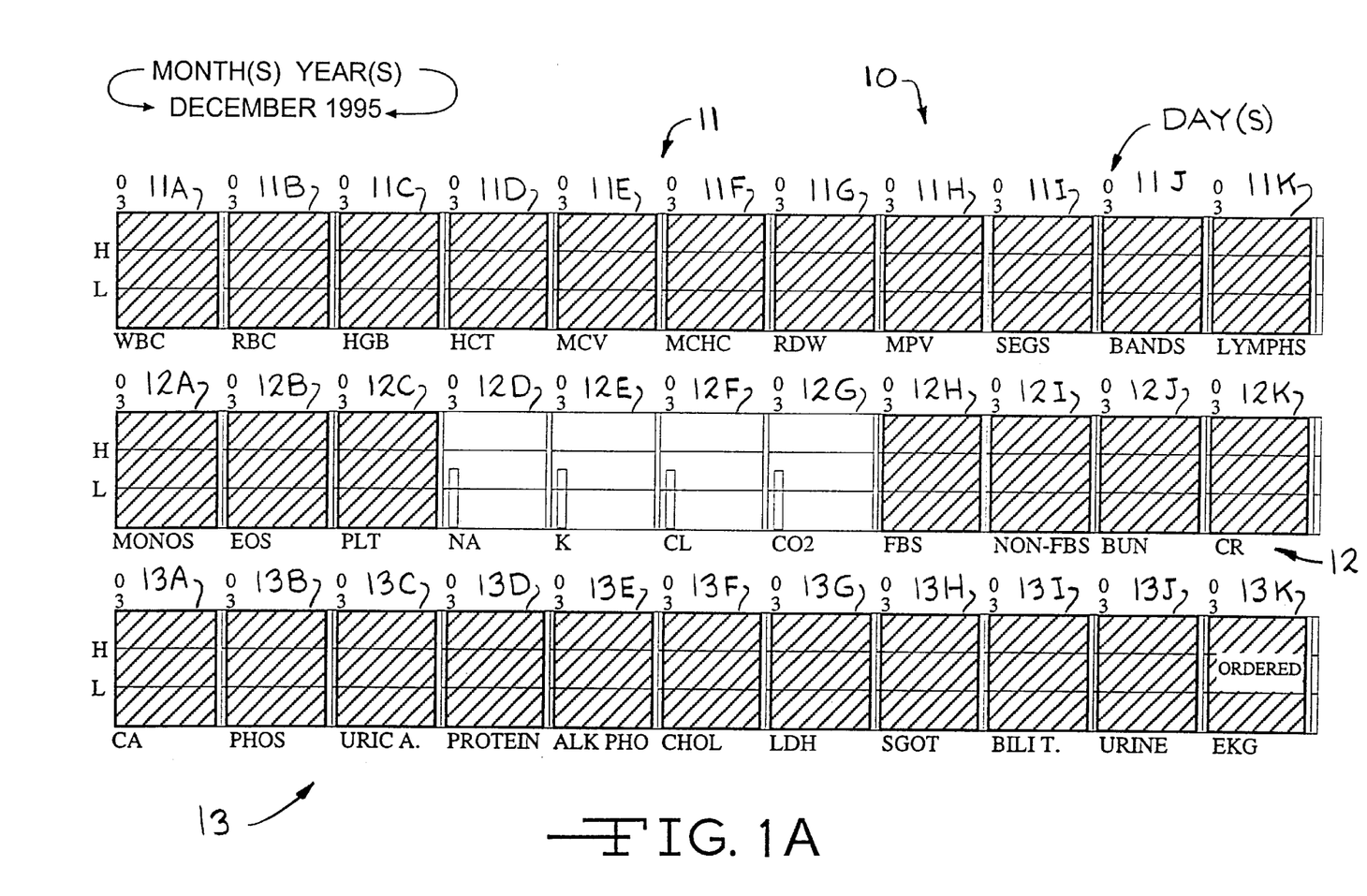
FIGS. 1A and 1B is a first embodiment of a graphic presentation chart of medical tests for a patient having tests written but prior to any test results being available in accordance with the present invention.
Figure 1B:
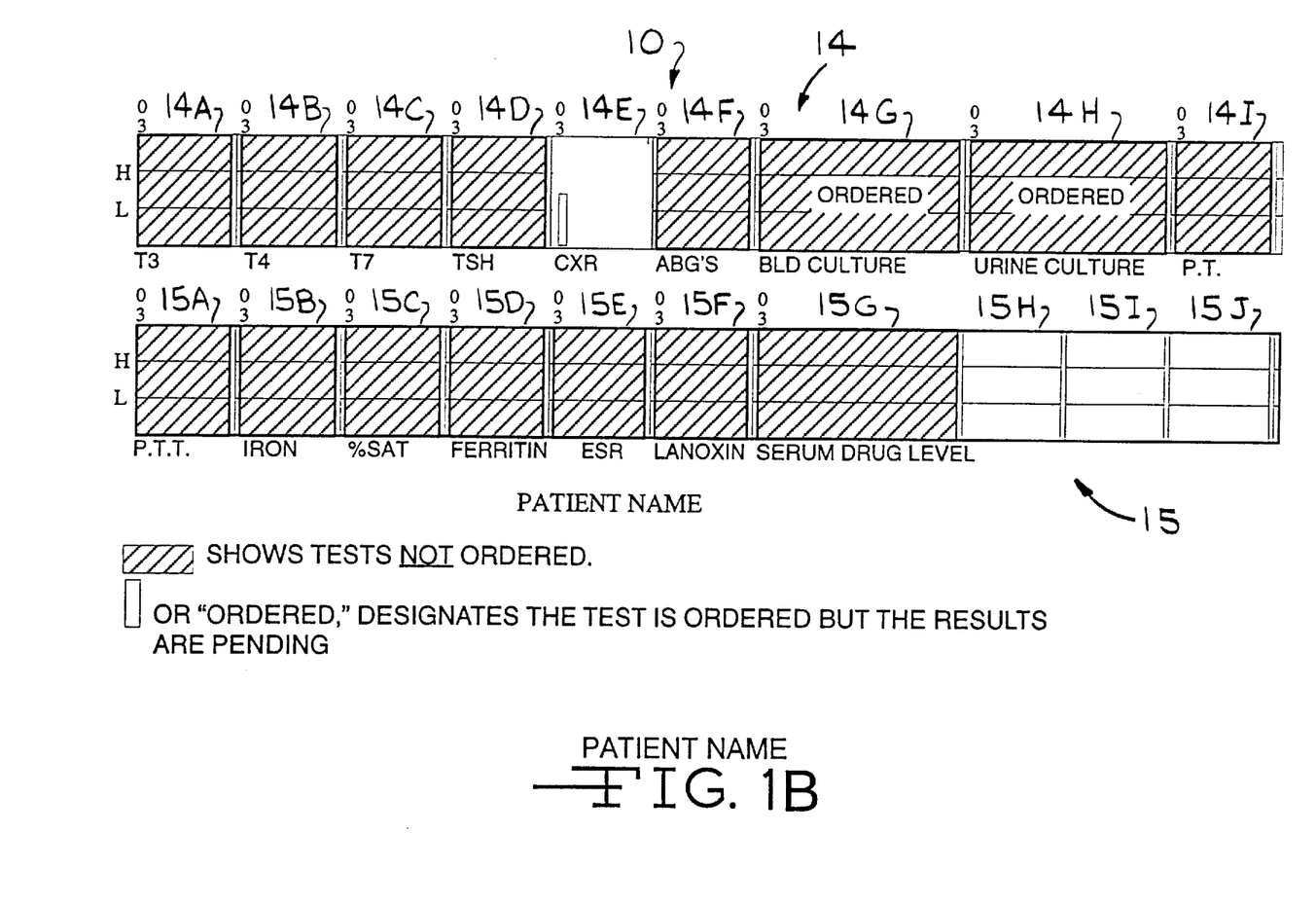

Referring now to the drawings, there is illustrated in FIGS. 1A and 1B a graphic presentation chart, indicated generally at 10, of medical laboratory tests for a patient prior to any test results being available in accordance with the present invention. As shown therein, the chart 10 is an example of a first day of admission of a patient to a hospital. The chart 10 includes a plurality of horizontally extending rows, indicated generally at 11, 12, 13, 14, and 15. Each of the rows 11, 12, 13, 14, and 15 is provided with a plurality of individual boxes. In particular, row 11 includes boxes 11A through 11K, row 12 includes boxes 12A through 12K, row 13 includes boxes 13A through 13K, row 14 includes boxes 14A through 14I, and row 15 includes boxes 15A through 15J.

Each of the respective boxes 11A through 11K, 12A through 12K, 13A through 13K, 14A through 14I, and 15A through 15J is provided with indicia at the lower right hand corner thereof representing a particular medical laboratory test, some of the tests being denoted using known medical terminology therefor. While the chart 10 designates various medical laboratory tests, the chart 10 is not limited to only those tests which are shown but can include other known medical laboratory tests and/or other known medical non-laboratory tests.

The left far end of each of the rows 11, 12, 13, 14, and 15 is provided with indicia for indicating the value of each of the associated medical test results. In the illustrated embodiment, the indicia are shown as "H" for indicating a high test value, and "L" for indicating a low test value. Alternatively, other indicia can be used to designate the test results. For example, the indicia can be numbers or other similar data figures (not shown). Also, separate indicia can be provided for one or more individual boxes of a row.

At the upper left hand corner of the chart 10 is indicia representing the associated month and year for the test results. On the upper left hand corner of each of the associated individual boxes is indicia representing the day of the associated month for the test results. Structurally, each of the rows 11, 12, 13, 14, and 15 is generally similar to each other. Thus, for discussion purposes, only row 12 will be described in detail.

Row 12 includes a plurality of individual boxes, namely 12A, 12B, 12C, 12D, 12E, 12F, 12G, 12H, 12J, and 12K, separated from each other by appropriate means. In the illustrated embodiment, the boxes 12A through 12K are separated from a respective adjacent box by a shaded area 16. However, other means can be used to separate the boxes from one another. Structurally, each of the boxes 12A through 12K is similar to one another except that each respective box designates a different medical test, the particular test being shown underneath the associated box, and each respective box designates whether or not the particular test has been ordered for the patient. Specifically, boxes 12A, 12B, 12C, 12H, 12I, and 12K are each provided with a plurality of angled lines therein which are used to designate that the tests associated therewith have not been ordered for the patient. Boxes 12D, 12E, 12F, and 12G are each provided with an empty vertical bar to designate that the tests associated therewith have been ordered for the patient but the test results are not yet available. Alternatively, box 12J is provided with angled lines and also includes the word "ordered" written therewithin to designate that the test associated therewith has been ordered for the patient but the test result is not yet available. However, other means may be used to designate whether or not a test has been ordered for the patient. Also, only those tests which have been ordered can be shown on the chart 10.

Figure 2:
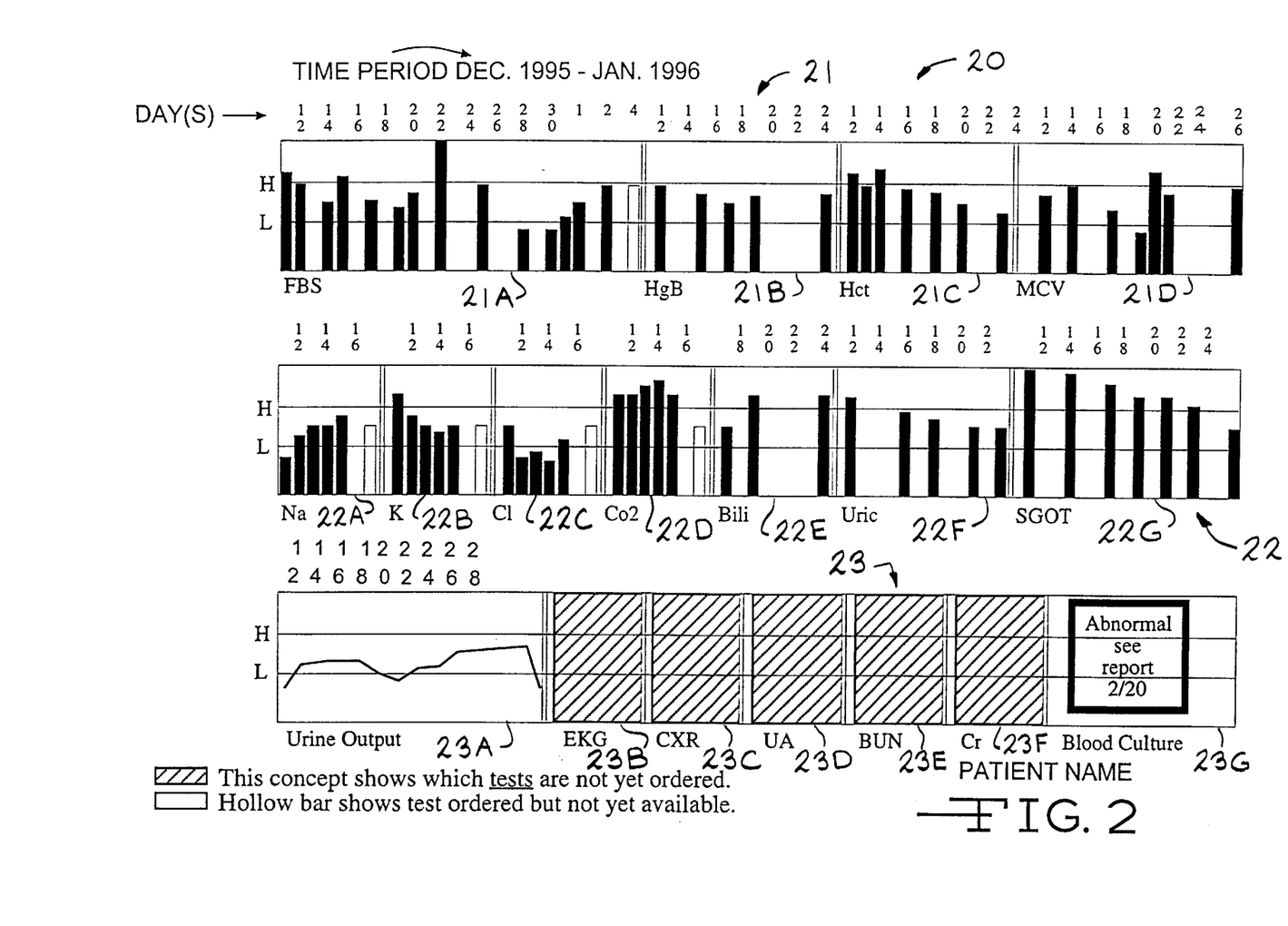
FIG. 2 is a second embodiment of a graphic presentation chart of medical tests for a patient showing the tests results for a number of various medical tests for the patient in accordance with this invention.

FIG. 2 is a graphic presentation chart, indicated generally at 20, showing the test results for a number of various medical tests for a patient over a particular time period in accordance with this invention. In particular, the chart 20 includes the three rows, namely rows 21, 22, and 23, for displaying test results for a patient for a time period Dec. 11, 1995 through Jan. 5, 1996. Row 21 includes boxes 21A through 21D, row 22 includes boxes 22A through 22G, and row 23 includes boxes 23A through 23G. Each of the respective boxes 21A through 21D, 22A through 22G, and 23A through 23G is provided with indicia at the lower right hand corner thereof representing a particular medical test, some of the tests being denoted using known medical terminology.

As shown in the chart 20, only the even days of the associated month are shown at the top of each of the respective boxes having test results or for which tests are ordered. However, all the days of the month may be listed, or only the odd days of the month may be listed, or only the days of the month having test results or having tests ordered may be listed. In addition, other means may be used to designate whether or not a test has been ordered for the patient, and the chart 20 can show only those tests which have been ordered for the patient.

Box 21A of the chart 20 is an example of medical laboratory test results for fasting blood sugar (FBS). As shown in box 21A, tests were ordered and results are shown for the 11th, 12th, 14th, 15th, 17th, 19th, 20, 22nd, 25th, 28th, 30th and the 31st of Dec. 1995, and the 1st and 3rd of Jan. 1996, as designated by the shaded vertical bars. A test was ordered but the results are not yet available for the 5th of Jan. 1996, as designated by the empty vertical bar. Tests were not ordered for the 13th, 16th, 18th, 21st, 23rd, 24th, 26th, 27th, and the 29th of Dec. 1995, and the 2nd and 4th of Jan. 1996, as designated by the absence of a vertical bar.

In row 23 of chart 20, box 23A graphically illustrates medical non-laboratory test results for a urine output for the patient for a time period Dec. 11, 1995 through Dec. 29, 1996 using a continuous line graph. Also, in row 23, box 23G indicates that the blood culture test results were abnormal and informs the patient's physician to see the report dated Dec. 20, 1995. Alternatively, the test results for chart 20 can be designated by other means.

Figure 3A:
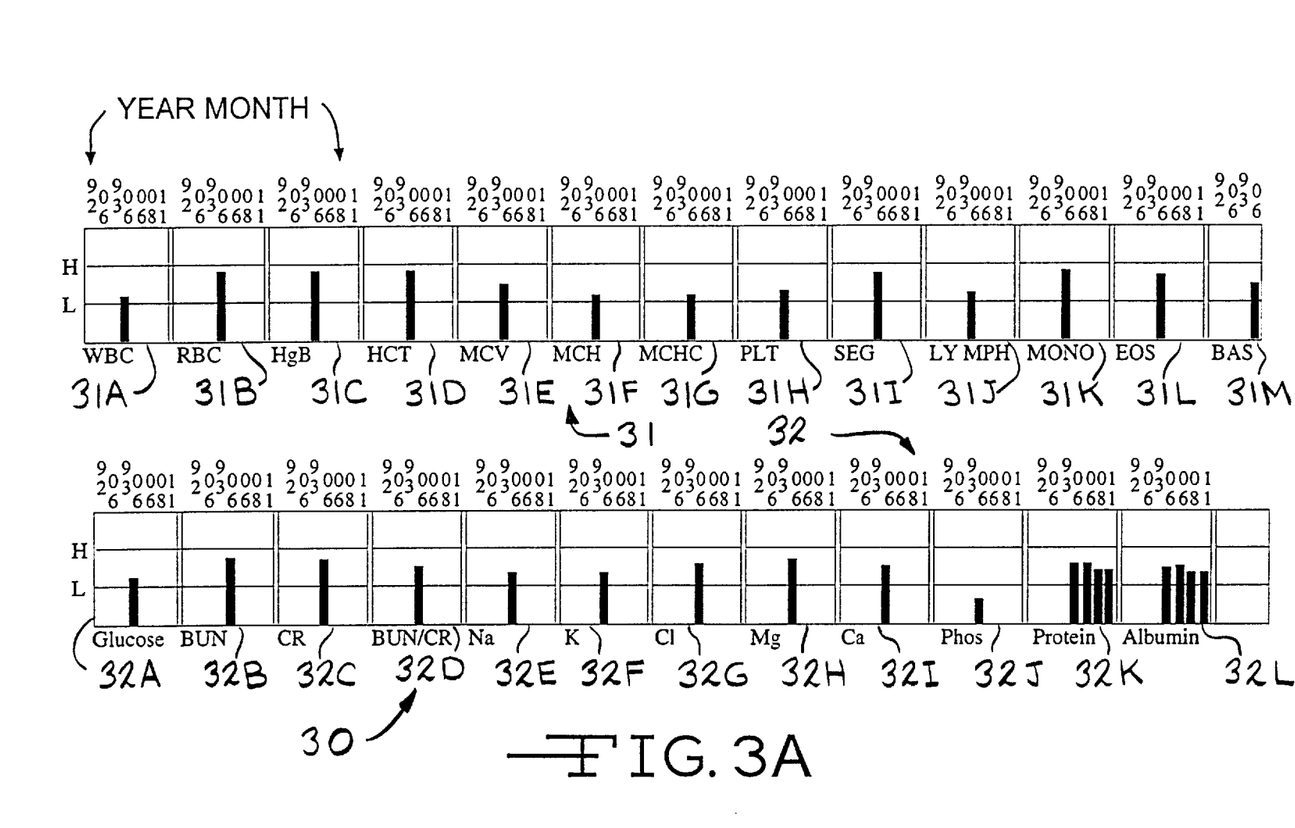
FIGS. 3A and 3B is a third embodiment of a graphic presentation chart of medical tests for a patient showing the tests results for a number of various medical tests for the patient in accordance with this invention.
Figure 3B:
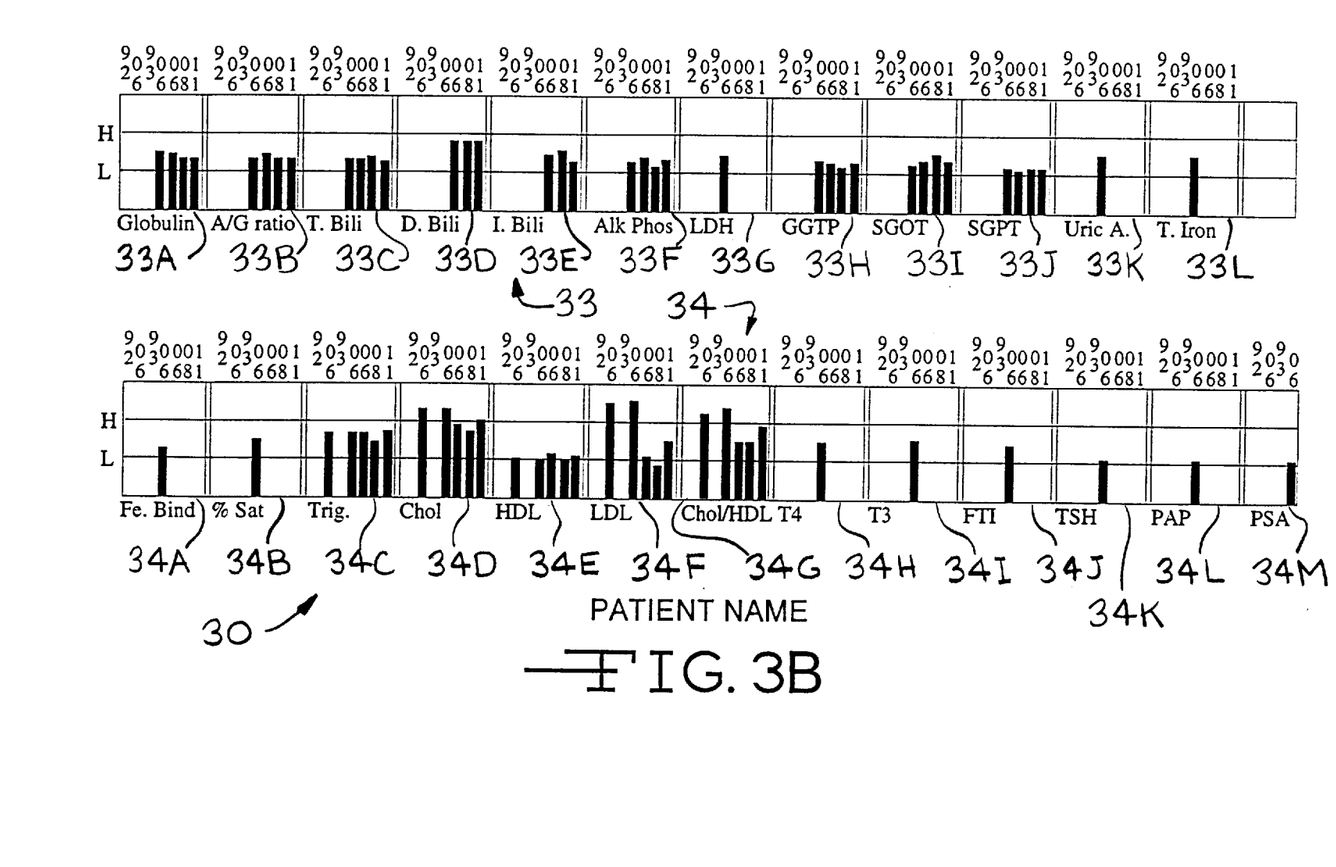
Figure 4A:
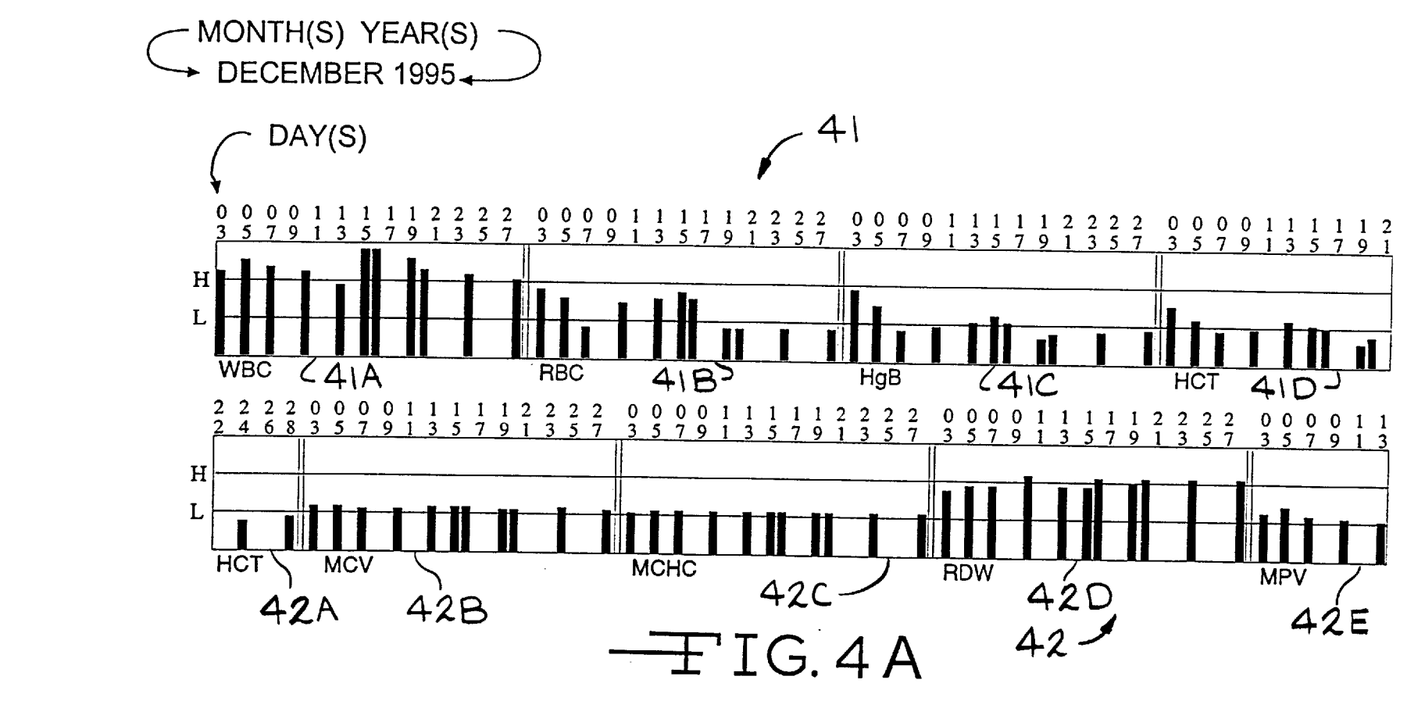
FIGS. 4A, 4B, 4C, 4D and 4E is a fourth embodiment of a graphic presentation chart of medical tests for a patient showing the test results for a number of various medical tests for the patient in accordance with this invention.
Figure 4B:
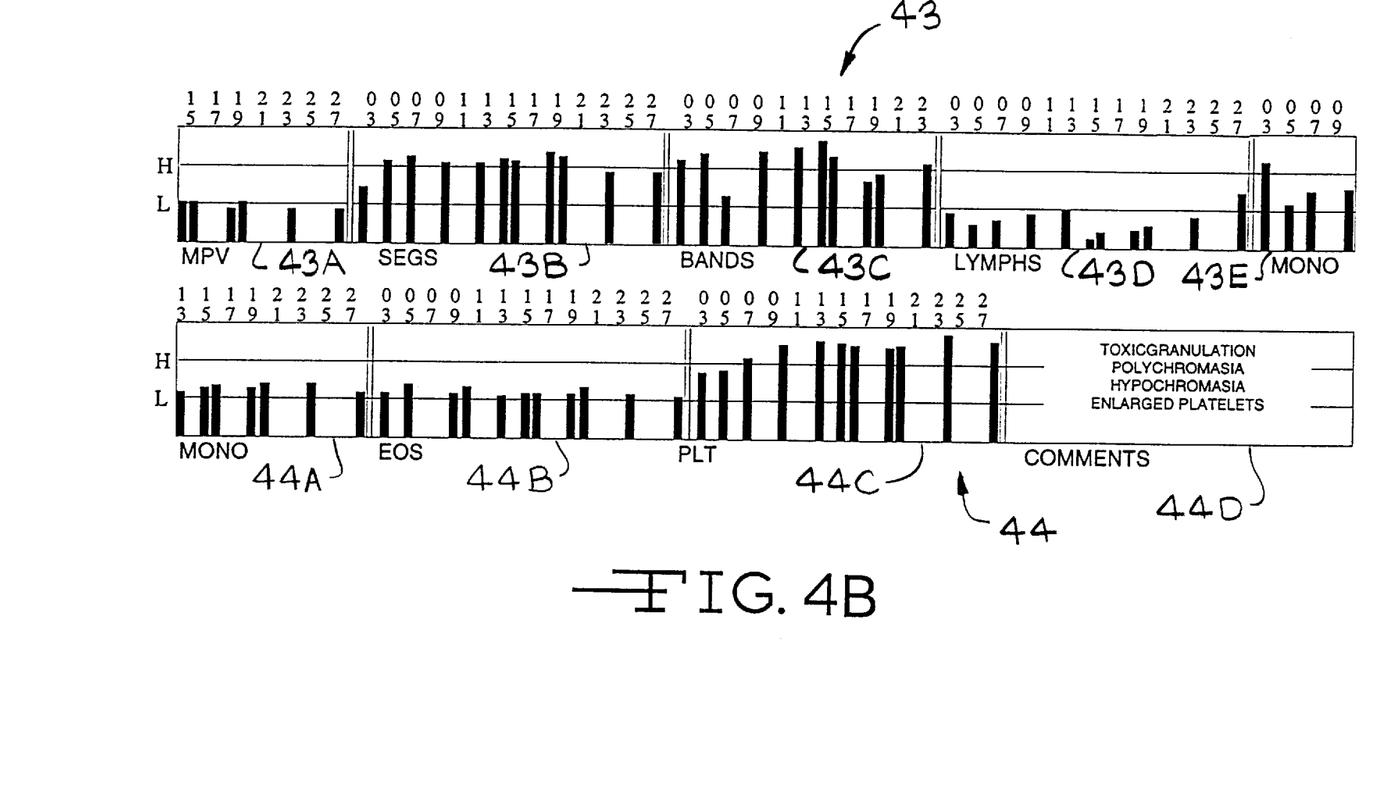
Figure 4C:
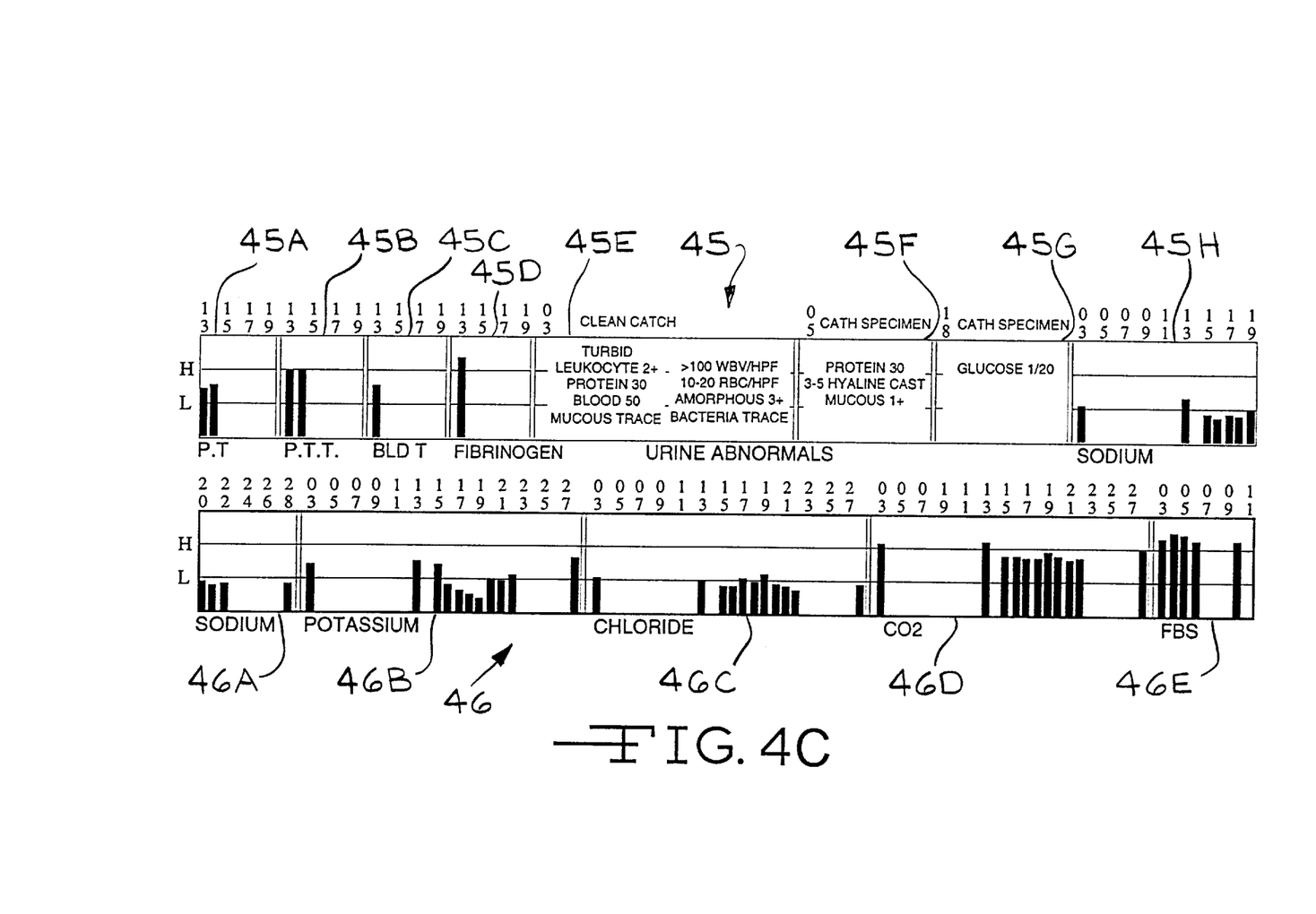
Figure 4D:
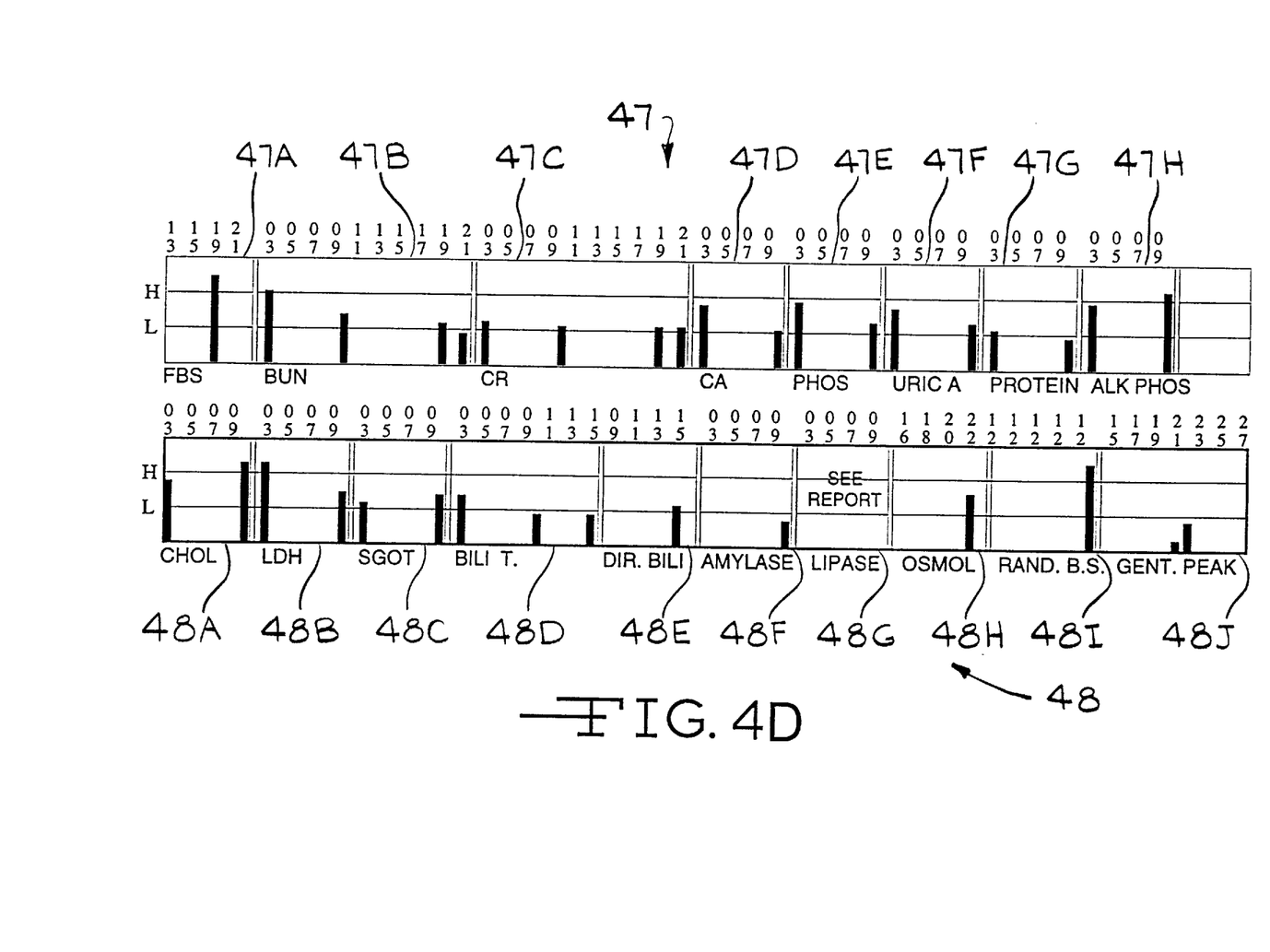
Figure 4E:
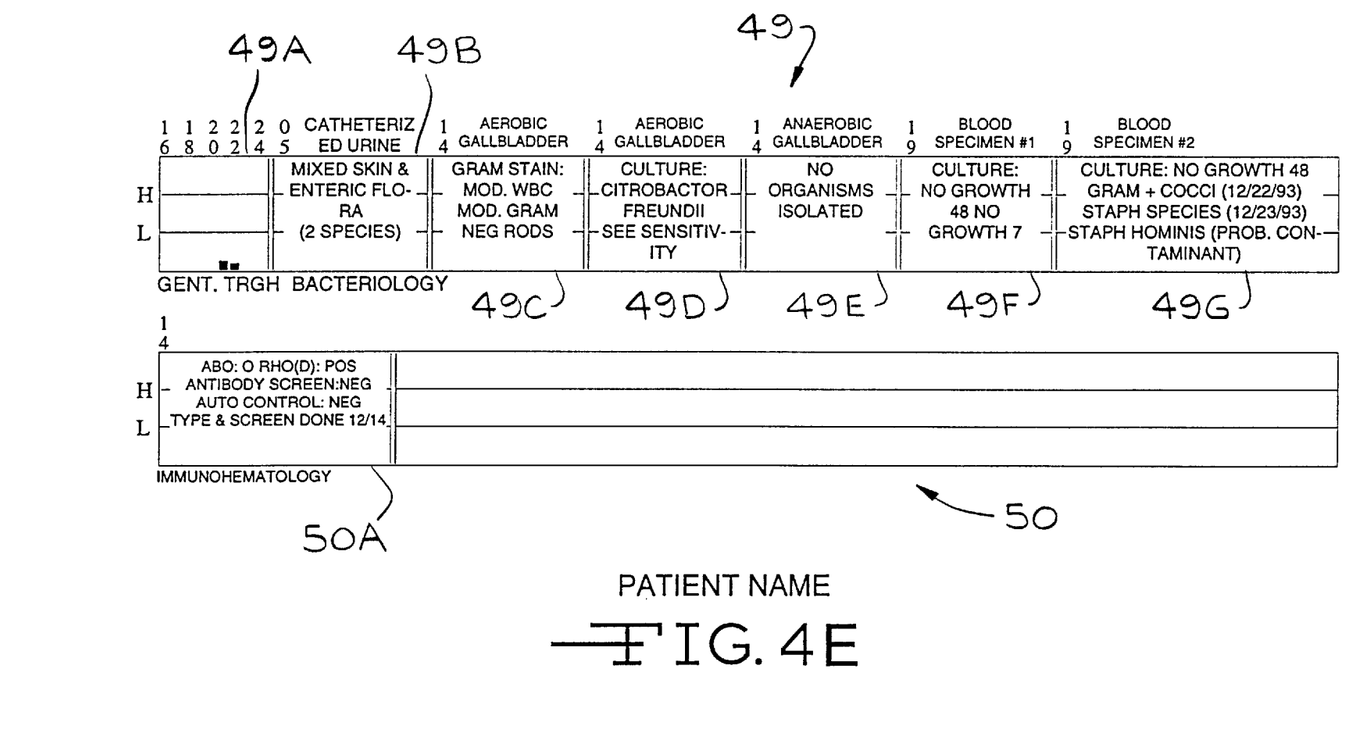

FIGS. 3A and 3B is a graphic presentation chart, indicated generally at 30, for a patient which shows the test results for a number of various medical tests over a seventeenth month period. As shown therein, the chart 30 includes three rows, namely rows 31, 32, 33, and 34, for displaying the test results for the patient. Row 31 includes boxes 31A through 31M, row 32 includes boxes 32A through 32L, row 33 includes boxes 33A through 33L, and row 34 includes boxes 34A through 34M. Each of the respective boxes 31A through 31M, 32A through 32L, 33A through 33L, and 34A through 34M is provided with indicia at the lower right hand corner thereof representing a particular medical test, some of the tests being denoted using known medical terminology.

In the chart 30, the particular years are printed in white against a black background, and the months are listed against a white background following the associated year. If a test is repeated in the same month for the year, the test results are listed in chronological order with the same month heading. Alternatively, the chart 30 can include indicia representing the day(s) for the month. Also, other means can be used to designate the test results for the chart 30.

FIGS. 4A, 4B, 4C, 4D, and 4E is a graphic presentation chart, indicated generally at 40, having a plurality of rows, namely rows 41 through 50, for displaying the test results for a patient for a number of various medical tests for the month of December 1995. Row 31 includes boxes 31A through 31M, row 32 includes boxes 32A through 32L, row 33 includes boxes 33A through 33L, and row 34 includes boxes 34A through 34M. Each of the respective boxes 31A through 31M, 32A through 32L, 33A through 33L, and 34A through 34M is provided with indicia at the lower right hand corner thereof representing a particular medical test, some of the tests being denoted using known medical terminology. Also, other means can be used to designate the test results for the chart 40. In addition, some of the boxes can information include which is not graphically displayed. For example, boxes 44D, 45E, 45F, 45G, 49A through 49G, and 50A include relevant patient information which is not displayed in a bar graph form.

The graphic presentation charts 10, 20, 30, and 40 of this invention are preferably generated by a computer. As a result, the associated charts 10, 20, 30, and 40 can be printed out in hard copy, displayed on a cathode ray tube (CRT) monitor, a liquid crystal display (LCD), especially hand held devices, or simply displayed on a computer screen. As graphic data is added to the associated charts 10, 20, 30, and 40, the data scrolls off the row to the right to begin a new row. Thus, a patient's complete report of medical tests can usually be displayed on a single page graphic presentation chart.

One advantage of this invention is that the graphic presentation chart 10, 20, 30, and 40 provides a quick, easy to read, and complete review of medical test results. Also, the graphic presentation chart 10, 20, 30, and 40 provides a check list or reminder of what tests have been ordered, and what tests have not been ordered. In addition, the graphic presentation chart 10, 20, 30, and 40 makes is easier for a physician to recognize patient trends, and also can display past medical test results for a patient along with the current test results.

The graphic presentation chart 10, 20, 30, and 40 of this invention also makes it easier to recognize time intervals between tests. As a result, a physician can easily recognize that a certain medical test is due to be ordered so that the results can be re-checked. Also, since the results of the tests are graphically displayed on the associated chart 10, 20, 30, and 40, abnormal results are more easy to recognize.

In accordance with the provisions of the patents statues, the principle and mode of operation of this invention have been described and illustrated in its preferred embodiments. However, it must be understood that the invention may be practiced otherwise than as specifically explained and illustrated without departing from the scope or spirit of the attached claims.

What is claimed is:

1. A method for producing a graphic presentation chart of medical tests for a patient comprising the steps of:
    (a) ordering a plurality of medical tests for a patient;
    (b) obtaining numerical medical test data for the plurality of medical tests;
    (c) converting the numerical test data for the plurality of medical tests into a graphic form; and
    (d) displaying the graphic form for the plurality of medical tests in a graphic presentation chart, the graphic presentation chart including at least one horizontally extending row having a plurality of individual boxes each of the boxes provided with first indicia to indicate a name of the ordered medical tests, second indicia to indicate an associated date for the ordered medical tests, third indicia to indicate test results for the ordered medical tests, fourth indicia to indicate a value for the test results for the ordered medical tests, fifth indicia to indicate non-ordered medical tests for a patient, and sixth indicia to indicate ordered medical tests for the patient which tests results are not available.

2. The method for producing a graphic presentation chart according to claim 1 wherein the third indicia is a solid bar graph.

3. The method for producing a graphic presentation chart according to claim 1 wherein the fifth indicia is a plurality of angled lines and the sixth indicia is an empty bar graph.

4. The method for producing a graphic presentation chart according to claim 1 wherein the first indicia is provided below each of the individual boxes, the second indicia is provided above each of the individual boxes, and the third indicia is provided at a left side of the graphic presentation chart.

5. The method for producing a graphic presentation chart according to claim 1 wherein the first indicia is provided below each of the individual boxes, the second indicia is provided above each of the individual boxes, and the third indicia is provided at a left side of each of the individual boxes.

6. The method for producing a graphic presentation chart according to claim 1 wherein the fourth indicia is represented as a "H" to indicate a high test value and a "L" to indicate a low test value.

7. A method for producing a graphic presentation chart of medical tests for a patient comprising the steps of:

(a) ordering at least one medical test for a patient;

(b) not ordering at least one medical test for a patient;

(c) obtaining numerical medical test data for the at least one ordered medical test;

(d) converting the numerical test data for the at least one ordered medical test into a graphic form; and (e) displaying the graphic form for the at least one ordered medical test in a graphic presentation chart, the graphic presentation chart including at least one horizontally extending row having a plurality of individual boxes, each of the boxes provided with first indicia to indicate a name for the at least one ordered medical test, second indicia to indicate an associated date for the at least one ordered medical test, third indicia to indicate test results for the at least one ordered medical test, fourth indicia to indicate a value for the test results for the at least one ordered medical test, and fifth indicia to indicate a name for the at least one non-ordered medical test.

8. The method for producing a graphic presentation chart according to claim 7 wherein the first indicia is provided below each of the individual boxes, the second indicia is provided above each of the individual boxes, and the third indicia is provided at a left side of the graphic presentation chart.

9. The method for producing a graphic presentation chart according to claim 7 wherein the third indicia is a solid bar graph.

10. The method for producing a graphic presentation chart according to claim 7 wherein the first indicia is provided below each of the individual boxes, the second indicia is provided above each of the individual boxes, and the third indicia is provided at a left side of each of the individual boxes.

11. The method for producing a graphic presentation chart according to claim 7 wherein the fourth indicia is represented as a "H" to indicate a high test value and a "L" to indicate a low test value.

12. A method for producing a graphic presentation chart of medical tests for a patient comprising the steps of:

(a) ordering at least one medical test for a patient;

(b) not ordering at least one medical test for the patient:

(c) obtaining numerical medical test data for the at least one ordered medical test;

(d) converting the numerical test data for the at least one ordered medical test into a graphic form; and (e) displaying the graphic form for the at least one ordered medical test in a graphic presentation chart, the graphic presentation chart including first indicia for indicating test results for the at least one ordered medical test and second indicia for indicating a name for the at least one non-ordered medical test.

13. The method for producing a graphic presentation chart according to claim 12 wherein the graphic presentation chart includes at least one horizontally extending row having a plurality of individual boxes.

14. The method for producing a graphic presentation chart according to claim 13 wherein each of the boxes is provided with third indicia to indicate a name for the at least one ordered medical test.

15. The method for producing a graphic presentation chart according to claim 14 wherein each of the boxes is provided with fourth indicia to indicate an associated date for the at least one ordered medical test.

16. The method for producing a graphic presentation chart according to claim 15 wherein each of the boxes is provided with fifth indicia to indicate test results for the at least one ordered medical test.

17. The method for producing a graphic presentation chart according to claim 16 wherein each of the boxes is provided with sixth indicia to indicate a value for the test results for the at least one ordered medical test.

18. The method for producing a graphic presentation chart according to claim 17 wherein each of the boxes is provided with seventh indicia to indicate that test results are not yet available for the at least one ordered medical test.

* * * * *